United States Patent

Gassmann

Patent Number: 5,518,095
Date of Patent: May 21, 1996

[54] COUPLING FOR TRANSMITTING TORQUE

[75] Inventor: Theodor Gassmann, Siegburg, Germany

[73] Assignee: GKN Automotive AG, Lohmar, Germany

[21] Appl. No.: 292,884

[22] Filed: Aug. 19, 1994

[30] Foreign Application Priority Data

Aug. 19, 1993 [DE] Germany .................. 43 27 892.2

[51] Int. Cl.⁶ .................................................. F16D 31/04
[52] U.S. Cl. ................................................... 192/61
[58] Field of Search ................... 192/61, 58 R; 475/168; 60/325, 329, 435, 428

[56] References Cited

U.S. PATENT DOCUMENTS

| | | | |
|---|---|---|---|
| 1,341,846 | 6/1920 | Gollings | 192/61 X |
| 2,300,626 | 11/1942 | McLaren | 192/61 X |
| 4,188,785 | 2/1980 | Ando et al. | 60/325 |
| 4,658,583 | 4/1987 | Shropshire | 60/428 |
| 4,909,371 | 3/1990 | Okamoto et al. | 192/103 F |
| 4,924,989 | 5/1990 | Filderman | 192/61 X |
| 5,096,398 | 3/1992 | Cozens | 418/171 |

FOREIGN PATENT DOCUMENTS

| | | | |
|---|---|---|---|
| 887289 | 7/1949 | Germany | 192/58 R |
| 2031508 | 12/1971 | Germany | 192/61 |
| 3709262A1 | 9/1988 | Germany . | |
| 3520884C2 | 4/1993 | Germany . | |
| 56-3326 | 1/1981 | Japan | 192/61 |
| 447469 | 3/1986 | Japan . | |
| 61-157837 | 7/1986 | Japan | 192/61 |

*Primary Examiner*—John E. Ryznic
*Attorney, Agent, or Firm*—Harness, Dickey & Pierce

[57] ABSTRACT

A coupling for transmitting torque between a driving part and a driven part has a hydraulic displacement system which includes a housing having an internally trochoidal shape and a rotor having an externally trochoidal shape. A displacer having a trochoidal shape is positioned between the housing and the rotor. Chamber regions created between the rotor and displacer and displacer and housing are connected by throttle openings in the displacer. An extra trochoidal tooth is provided on the trochoidal face of the housing casing relative to the displacer and on the displacer relative to the rotor.

6 Claims, 3 Drawing Sheets

COUPLING FOR TRANSMITTING TORQUE

BACKGROUND OF THE INVENTION

The present invention relates to a coupling for transmitting torque between a driving part and a driven part. The coupling has a hydraulic displacement system which is arranged between the two parts. The displacement system acts against relative rotational movements of the two torque loaded parts relative to one another. The displacement system includes a housing with an internally trochoidal housing casing and two housing covers. Also, an externally trochoidal rotor rotatably held in the housing. The housing and rotor each are connected to one of the torque loaded parts and form a sealed inner chamber which is at least partially filled with a fluid. A displacer, in the shape of a trochoid casing, is arranged between the housing casing and the rotor is guided between the trochoidal face of the housing casing and the trochoidal face of the rotor. The displacer divides the inner chamber relative to the housing casing and relative to the rotor into inner and outer chamber regions. One extra trochoidal tooth is provided on the trochoidal face of the housing casing relative to the displacer and on the displacer relative to the trochoidal face of the rotor.

Coupling assemblies are used in drivelines of motor vehicles and land machinery to generate a locking torque between two rotating parts as a function of a speed differential.

A first application refers to differential drives where the coupling is arranged between two parts which rotate relative to one another in the case of differential movements. As a result of the coupling, the differential drives have a partial locking effect.

A second application refers to the driveline of a motor vehicle with a plurality of driven axles, with the coupling fitted directly in the driveline. As a result, the respective driveline is torque-loaded only if a speed differential occurs between its driven axle and a rigidly driven further axle, whereas otherwise, its axle is driven dragged along by the vehicle.

A coupling is known from U.S. Pat. No. 4,658,583 in which the two inner and outer chamber regions each form a displacer pump. The two pumps are connected with a consumer by means of a regulating and control system. In a known way, the device constitutes two trochoid pumps which are used for the power-assisted steering system of a motor vehicle.

A coupling of a similar type is shown in JP 4-27269. The coupling is connected to a differential drive in such a way that the housing is integral with the differential carrier, whereas the rotor is non-rotatably positioned on one of the axle shafts. Every differential movement between the axle shafts of the differential drive results in a relative movement between the housing and rotor of the coupling. By displacing the enclosed viscous fluid and as a result of its return flow through the sealing gap between the rotor and housing, it is possible to generate a partial locking effect of the differential. The locking effect of the coupling can only he adjusted by means of the tolerances between the housing and rotor, which, in view of the standard production accuracy, is an inaccurate method of adjustment.

SUMMARY OF THE INVENTION

It is therefore an object of the invention to provide an easily adjustable coupling which is produced by simple means and which, while having small dimensions, is able to accommodate high performance values.

The objective is achieved by the chamber regions connected to one another in pairs by throttle openings, however, they are otherwise largely sealed relative to one another against any overflowing liquid.

In this way, a double trochoidal pump assembly is provided where the displacer is force-guided by the surfaces of the inner trochoids of the housing and the outer trochoids of the rotor. The throttle openings, in each case, connect one pumping and one suction chamber to one another in such a way that when one chamber region accommodates its maximum volume, the other chamber region features its minimum volume. An advantage of such a coupling is an increased conveying power so that it is possible to operate with a low pressure level. Because of the non-sliding rolling movement of the trochoids it is possible to use high-viscosity oils, especially silicone oils, their advantage is that they are only marginally dependent on temperature.

There are two possibilities of designing the throttle openings. On the one hand, they may be provided directly in the wall of the displacer; and on the other hand, it is possible to provide a connection by means of outer channels in the housing. In the former case, the connected chambers are in the same circumferential position inside and outside the displacer and adjoining same, and in the latter case, the connected chambers are radially opposed and they are both positioned outside or both positioned inside the displacer.

The design of the former embodiment of the throttle opening is much simpler. The second embodiment enables the throttle openings to be controlled, which means that certain torque characteristics of the coupling can be set as a function of the differential speed.

Further throttling means which, below, for the sake of simplicity, will be referred to as throttle openings, in addition to fixed throttle bores, may be provided in the form of flow limiting valves, control valves or special valves for electro-theological fluids which, in such cases, may be used as operating fluids.

The torque of the assembly is inversely proportional to the square of the throttle cross-section of the throttle openings. Therefore, by slightly changing the throttle cross-section it is possible to change the accommodated torque a considerable extent, as a result of which the coupling becomes easily controllable. As the operating principle of the coupling is based on throttling the volume flow conveyed, the torque is only indirectly dependent on the viscosity of the operating fluid. By suitably designing the throttle cross-section, it is possible to keep the resistance coefficient of the throttle openings almost constant over a wide range of viscosity of the operating fluid, as a result of which it is possible to reduce the influence of viscosity and thus of temperature on the accommodated torque. The differential speed between the housing and rotor enters the accommodated torque quadratically, which results in progressive coupling characteristics as a function of the differential speed.

If the throttle opening is provided as a combination of a throttle diaphragm and a throttle channel, one obtains for the torque a sum consisting of a linear and a quadratic content. Thus, by suitably dimensioning the throttle diaphragm and throttle channel, it is possible to obtain largely freely adjustable torque characteristics.

From the following detailed description taken in conjunction with the accompanying drawings and subjoined claims, other objects and advantages of the present invention will become apparent to those skilled in the art.

BRIEF DESCRIPTION OF THE DRAWINGS

An embodiment of the invention is illustrated in the drawing wherein.

DETAILED DESCRIPTION OF THE PREFERRED EMBODIMENTS

Figure 1:
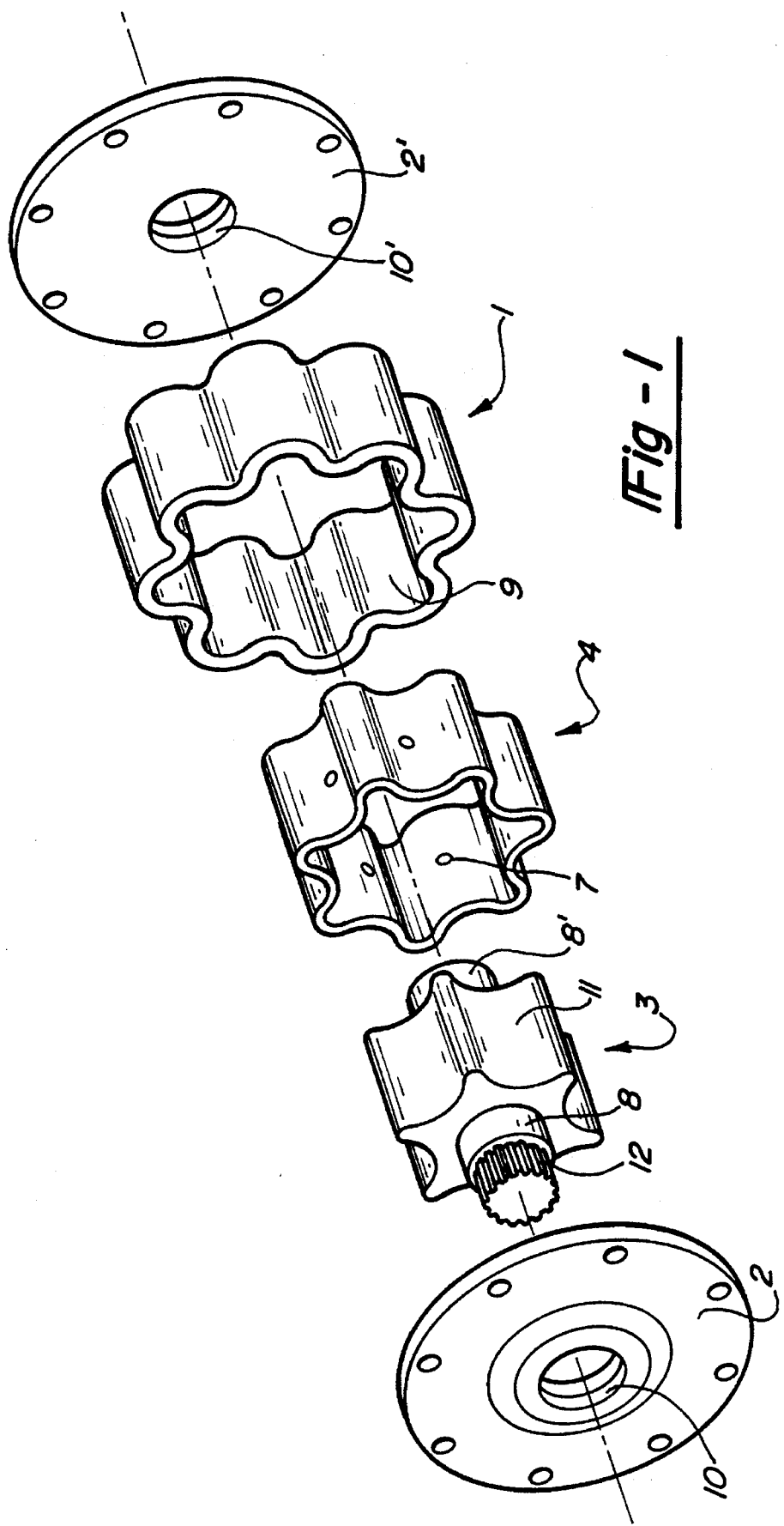
FIG. 1 is an exploded view of a torque transmitting coupling in accordance with the invention.

FIG. 1 shows the coupling whose parts are dismantled along the rotational axis. A housing casing 1, whose cross-section is internally trochoidal, is coupled with two housing covers 2, 2', which parts jointly form the housing. The housing accommodates a rotor 3 which is rotatably supported in the housing. The rotor cross-section is externally trochoidal. The rotor 3, by means of bearing pins 8, 8', is supported in bearing bores 10, 10' in the housing covers. One of the bearing pins 8 includes driving teeth 12. The housing casing 1, together with the housing covers 2, 2' and the rotor 3, form an inner chamber in which there is guided a displacer 4 whose cross-section has the shape of a trochoidal casing. The displacer 4 is provided with throttle openings 7 which pass through its wall.

Figure 2:
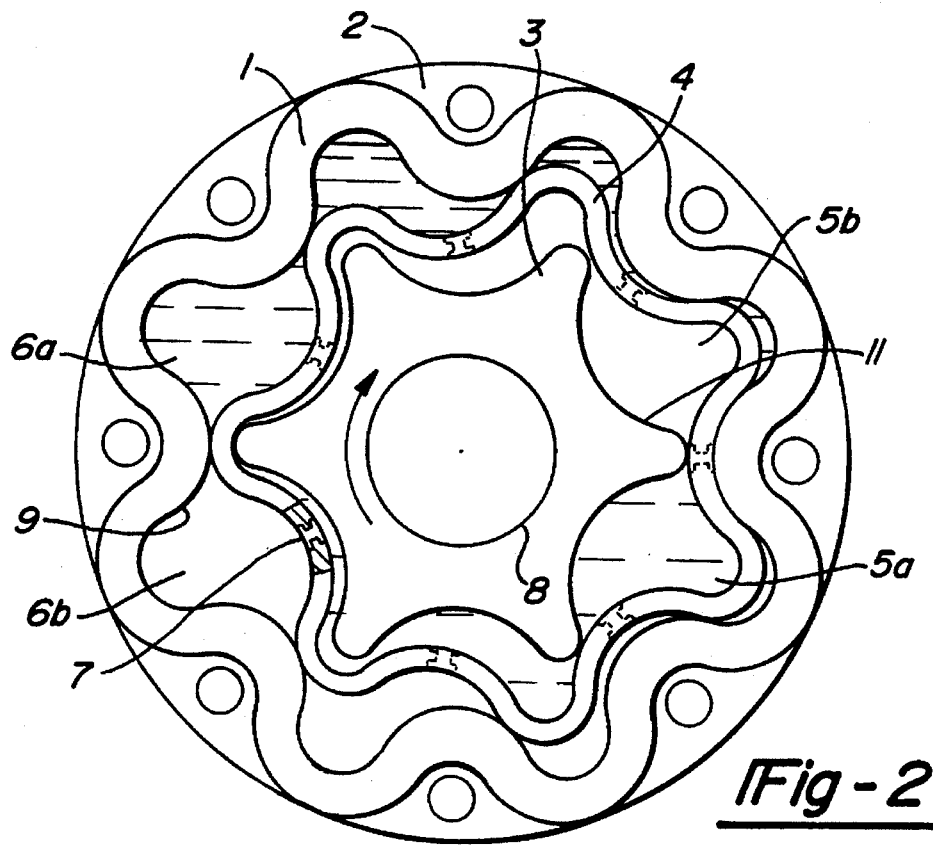
FIG. 2 is a cross-sectional view through the assembled coupling according to FIG. 1.

FIG. 2 shows a cross-sectional view of the coupling. The internally trochoidal surface 9 of the housing casing 1 includes one more "tooth" or "shaft" than the displacer 4 whose inner and outer surfaces are similar. The displacer 4, in turn, includes one more "tooth" or "shaft" than the externally trochoidal surface 11 of the rotor 3. If a relative speed differential occurs between the housing casing and rotor, the displacer 4, shaped like a trochoidal casing, rotates at half the differential speed eccentrically between the two. Thus, the displacer rotates in the inner chamber between the externally trochoidal rotor 3 and the internally trochoidal housing casing 1. The displacer 4 divides the inner chamber into a plurality of outer chamber regions 6 and a plurality of inner chamber regions 5. The displacer 4 includes throttle openings or apertures 7 which connect a radially overlapping, circumferentially positioned outer suction chamber region 6b to an inner pumping chamber region 5a and, vice versa, an outer pumping chamber region 6a to an inner suction chamber region 5b. The cross-section of the throttle opening 7 is controllable by control elements 7' such as flow limiting valves, control valves or special valves for electrorheological fluids which in such cases may be used as operating fluids.

Figure 3:
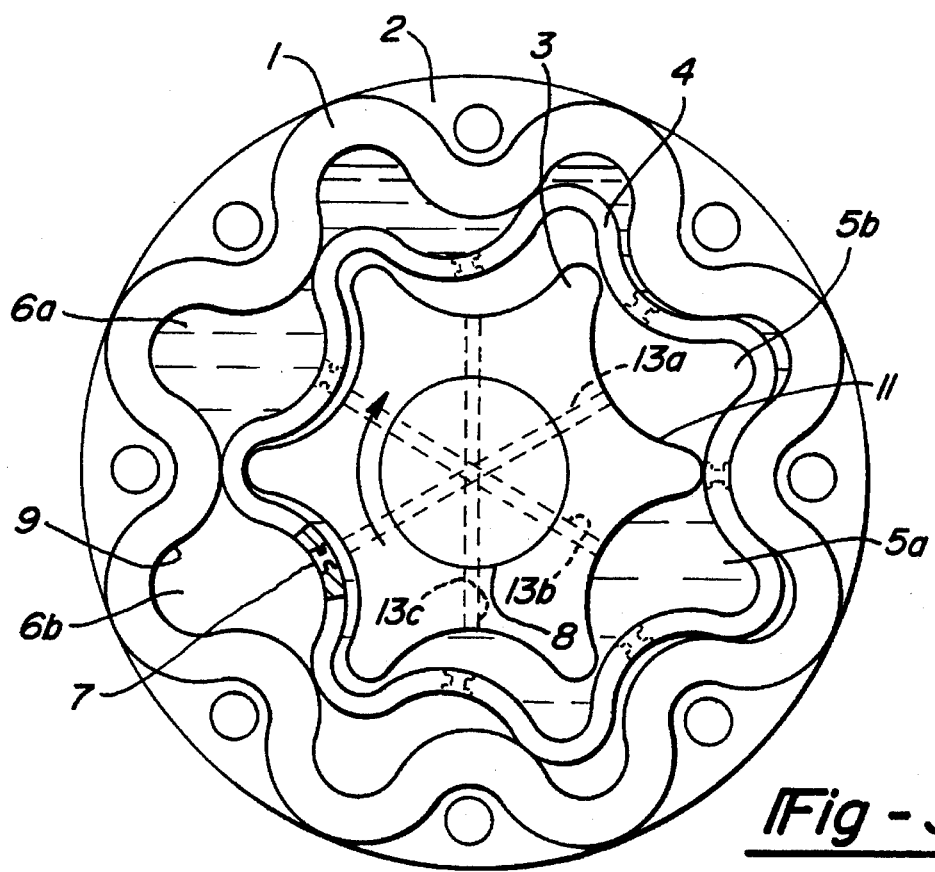
FIG. 3 is a cross-sectional view through an assembled coupling similar to that one of FIG. 2.

FIG. 3 shows a cross-sectional view of another coupling similar to that of FIG. 2. The internally trochoidal surface 9 of the housing casing 1 includes one more "tooth" or "ondulation" than the externally trochoidal surface 11 of the rotor 3. When a relative speed differential occurs between the housing casing and the rotor, the displacer, shaped like a trochoidal mantle, rotates at half the differential speed eccentrically between the two aforementioned ones. Thus, the displacer rotates in the inner chamber between the externally trochoidal rotor 3 and the internally trochoidal housing casing 1. The displacer 4 divides the inner chamber into a plurality of outer partial chambers 6a and 6b and a plurality of inner partial chambers 5a and 5b. The displacer 4 includes throttle apertures, which connect radially corresponding inner and outer chamber partitions, namely an outer suction chamber partition 6b to an inner pumping chamber partition 5a and, vice versa, an outer pumping chamber partition 6b partition 6a to an inner suction chamber partition 5b. Different from the embodiment of FIG. 2, the rotor 3 comprises diametrically disposed control channels 13a, 13b, 13c lying in different cross-sectional planes of the rotor so as to be separate from each other. These channels in any position of the rotor connect an inner suction chamber partition 5b with an inner pumping chamber partition 5a.

Figure 4:
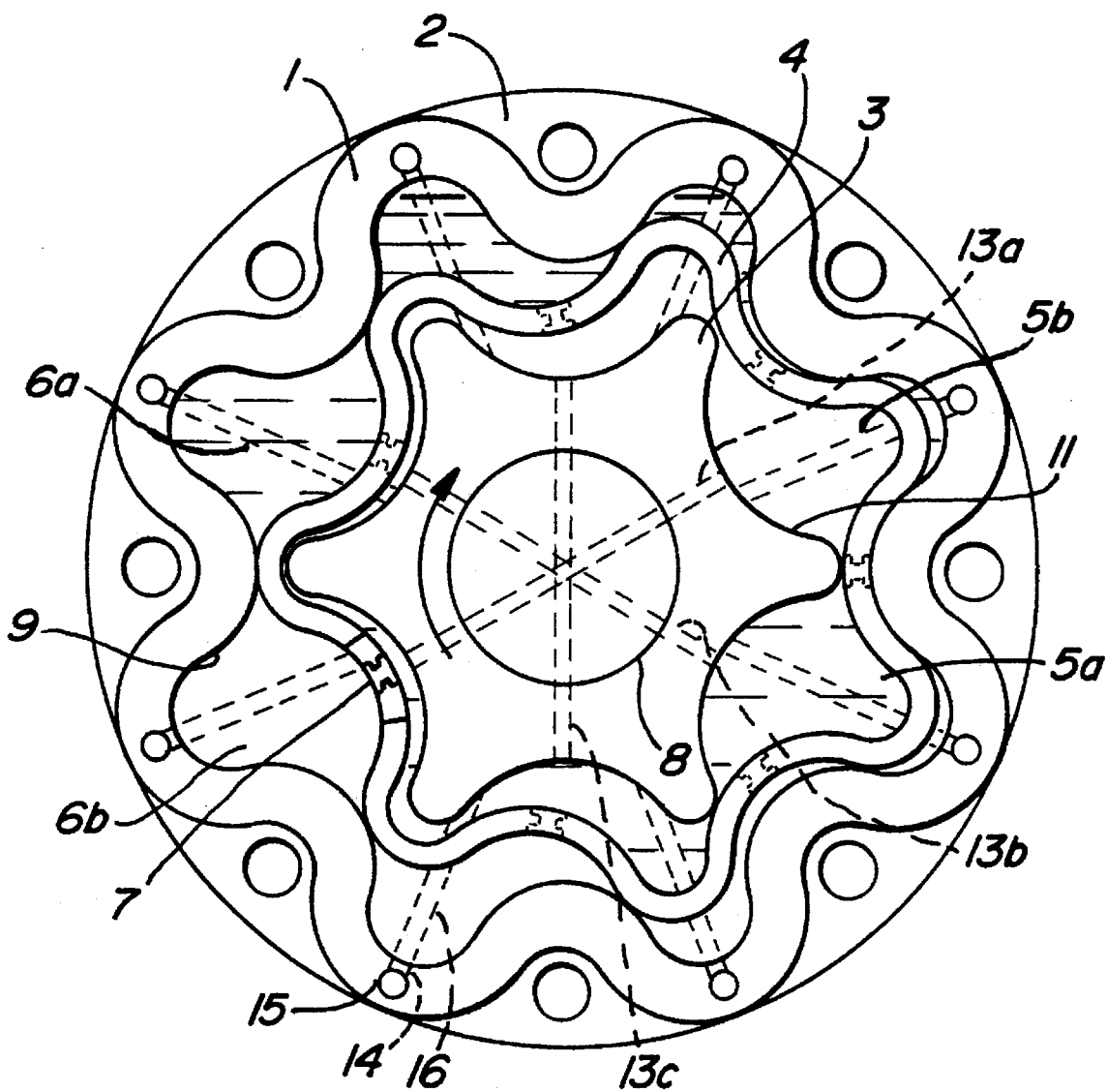
FIG. 4 is a cross-sectional view through an assembled coupling similar to that one of FIG. 2.

FIG. 4 shows a cross-sectional view of another coupling similar to that of FIG. 2. The internally trochoidal surface 9 of the housing casing 1 includes one more "tooth" or "ondulation" than the externally trochoidal surface 11 of the rotor 3. When a relative speed differential occurs between the housing casing and the rotor, the displacer, shaped like a trochoidal mantle, rotates at half the differential speed eccentrically between the two aforementioned ones. Thus, the displacer rotates in the inner chamber between the externally trochoidal rotor 3 and the internally trochoidal housing casing 1. The displacer 4 divides the inner chamber into a plurality of outer partial chambers 6a and 6b and a plurality of inner partial chambers 5a and 5b. The displacer 4 includes throttle apertures, which connect radially corresponding inner and outer chamber partitions, namely an outer suction chamber partition 6b to an inner pumping chamber partition 6a to an inner suction chamber partition 5b. Again, the rotor 3 comprises diametrically disposed control channels 13a, 13b, 13c lying in different cross-sectional planes of the rotor so as to be separate from each other. These channels in any position of the rotor connect an inner suction chamber partition 5b with an inner pumping chamber partition 5a. Additionally, there are diametrically opposed control channels 14 in the housing casing 1, open to the inner chamber, which are connected by axial bores 15 within the housing casing 1 to control channels 16 in the housing cover 2 with radially opposed control channels 14 being connected to each other to connect in any position of the rotor an outer suction chamber partition 6b to an outer pumping chamber partition 6a. The different radial control channels 16 are comprised in different cross-sectional planes in the housing cover so to not intersect each other. In this embodiment, the throttle openings 7 within the displacer 4 might as well be omitted.

While the above detailed description describes the preferred embodiment of the present invention, the invention is susceptible to modification, variation, and alteration without deviating from the scope and fair meaning of the subjoined claims.

I claim:

1. A coupling for transmitting torque between a driving part and a driven part, comprising:

a hydraulic displacement system arranged between said driving and driven parts, said displacement system acts against relative rotational movements of the two torque loaded driving and driven parts relative to one another, said displacement system comprising a housing including an internally trochoidal housing casing and two housing covers and an externally trochoidal rotor rotatably held in the housing, said housing and rotor each connected to one of the torque loaded driving and driven parts and forming a sealed inner chamber which is at least partially filled with a fluid;

a displacer arranged between the housing casing and the rotor, said displacer in the shape of a trochoid mantle, and said displacer guided between a trochoidal face of the housing casing and a trochoidal face of the rotor and said displacer divides the inner chamber relative to the housing casing and relative to the rotor into inner and outer chamber regions;

said chamber regions connected to one another in pairs by throttle openings, but are otherwise largely sealed relative to one another against any overflowing liquid;

one extra trochoidal tooth is provided on the trochoidal face of the housing casing relative to the displacer and on the displacer relative to the trochoidal face of the rotor.

2. A coupling according to claim 1, wherein the cross-section of the throttle openings is controllable by control elements.

3. A coupling according to claim 1, wherein the throttle openings are positioned in the wall of the displacer.

4. A coupling according to claim 1, wherein the throttle openings are positioned in control channels in the housing casing.

5. A coupling according to claim 1, wherein the throttle openings are positioned in control channels in the housing covers.

6. A coupling according to claim 1, wherein the throttle openings are positioned in control channels in the rotor.

* * * * *